April 9, 1940.  E. LILE  2,196,928

FISH TRAP

Filed Sept. 5, 1939

Inventor
ERNEST LILE

By Max Wall

Attorney

Patented Apr. 9, 1940

2,196,928

UNITED STATES PATENT OFFICE 2,196,928

FISH TRAP

Ernest Lile, Franklin, La.

Application September 5, 1939, Serial No. 293,492

3 Claims. (Cl. 43—100)

This invention relates to a trap for shell-fish such as crabs, shrimp, lobster, crayfish and the like, and among the objects of the invention are: to provide a simple and economical construction in a trap of this kind; to provide a trap which will attract and lure the shell-fish; to provide a trap where the bait appears to be readily accessible and yet cannot be obtained or molested by the shell-fish; to provide a trap which has a wide, easy entrance for the shell-fish which becomes progressively restricted as it approaches the trap opening, and which will effectively retain them in the trap so that they cannot escape.

These objects are accomplished according to this invention by the construction shown and described in the accompanying drawing and specification, the drawing being illustrative of a preferred embodiment of the invention, although it will be obvious that changes of construction and design may be made without departing from the spirit of the invention.

Figure 1:
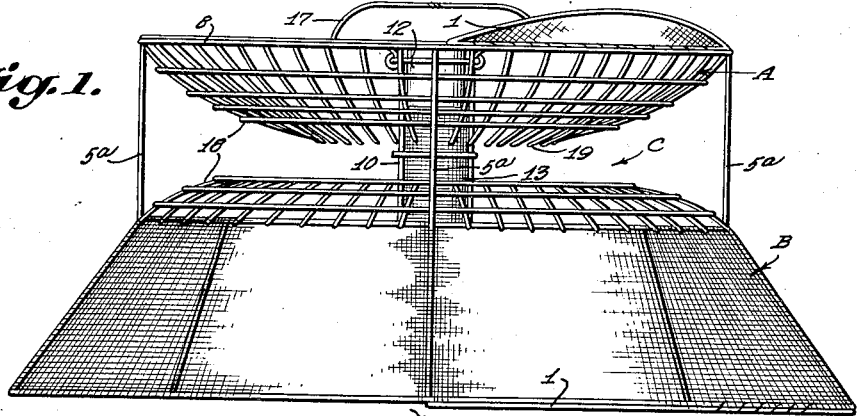
Figure 1 is a side elevation of the trap with the door to the upper compartment of the trap shown in open position.
Figure 2:
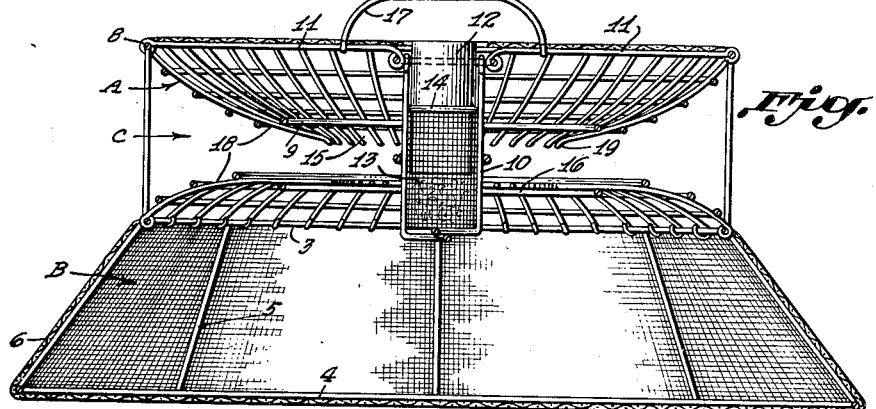
Figure 2 is a central vertical cross-section of the trap shown in Figure 1.
Figures 3, 4:
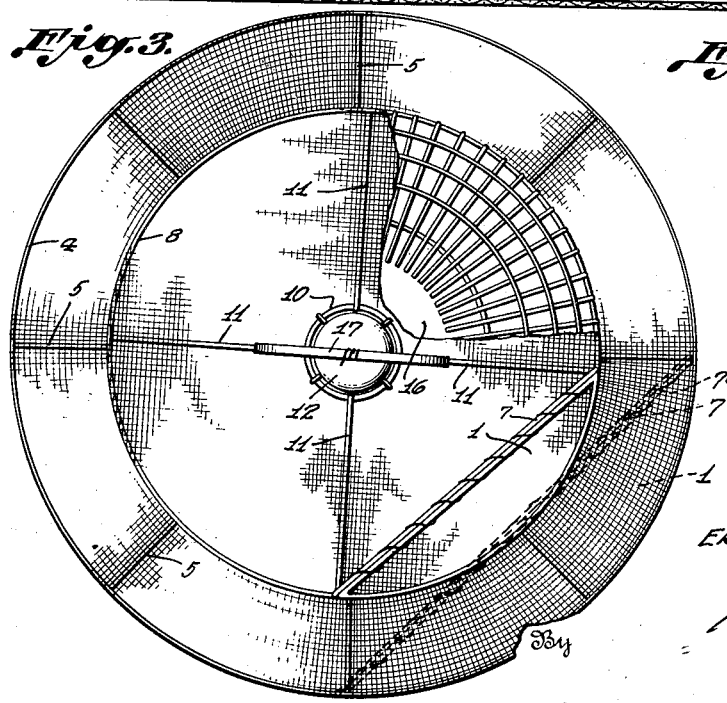
Figure 3 is a plan view thereof.
Figure 4 is a side elevation of the bait container.

In its general construction and arrangement, the trap comprises upper and lower dome-like shaped compartments A and B, spaced as at C, each of which is provided with a door 1. Each compartment is built up of a substantially rigid wire framework having a foraminous screen covering. The base, or lower compartment of the trap, is formed of a wire framework comprising substantially circular, spaced rings 3 and 4 joined by a series of stays 5. The upper ring 3 is of a diameter less than that of the bottom ring 4 so that when these are fastened together by means of the stays 5 they form, substantially, the outlines of a cone. This conical framework is covered by the foraminous screen 6 of a size mesh suitable to retain the fish intended to be trapped. A bar 7 cuts off a chord on the bottom of this cone-shaped compartment, and this chord forms a door for the compartment. The door is of a construction similar to that of the compartment, is suitably pivoted to this bar by wire binding or wire clips 7a, and any suitable means may be provided for fastening the door, as by twisting a piece of wire around the framework of the compartment and door, or by providing it with a hasp (not shown). This door provides a means for withdrawing the trapped fish from the trap.

The alternate stays 5 have vertical extensions 5a which project upwardly from the lower compartment B and at an obtuse angle to the stay 5. These vertical extensions 5a support the upper compartment A which is of a construction substantially similar to that of the lower compartment B. The upper ring 8 is spaced from the lower ring 9 by suitable screening and this upper compartment has a central opening through which a cage 10 is suspended by means of radial arms 11 secured to the ring 8, for the purpose of retaining the bait, and this cage projects through the compartment A into the space C between A and B. The upper and lower sections of the trap are substantially dome-like shaped in appearance, but the upper one is inverted with respect to the lower one, and their sloping surfaces 18 converge to points between the compartments, where they are maintained in spaced relation, as shown. A bait container is provided which has upper and lower telescoping sections 12 and 13, respectively, the upper portion 12 being an imperforate walled receptacle, open at one end, the lower portion 13 being formed entirely of screen wire. The upper portion is supported with respect to the lower portion by means of a ring 14, soldered or otherwise suitably secured to the cylindrical surface of receptacle 12, the ring resting on the upper edge of the portion 13.

Bait is inserted into the receptacle 12, which is then placed in inverted position into the lower receptacle 13 and the whole unit is then dropped into the cage 10. This brings the bait into visible position in the space provided between the compartments A and B.

The sloping surfaces of the adjacent compartments are provided with circular openings 15 and 16, respectively, adjacent the bait container and by reason of the construction the shell-fish, which may approach the trap from any direction, will be attracted by the bait and will be lured to the trap, crawling between the converging side wall surfaces of the respective dome-like structures, thus passing from an enlarged opening or space adjacent the outer surfaces of the trap to a gradually more restricted space until they reach the openings 15 and 16 which form the trap entrances around the bait and cage 10. The projecting ends of the screen forming the sloping surface 19 of the upper compartment A adjacent the opening 15, are bent slightly downwardly, so as to point in the direction of the opening 16, for the purpose of directing the shell-fish into the lower and larger compartment. In their attempts to reach the bait suspended in these openings, the shell-fish will fall into the bottom compartment or will crawl into the upper one and thus will become effectively trapped therein as they will be unable to work their way back out through these openings. Access to the trapped fish is easily obtained through the door which is provided in each compartment for this purpose.

A yoke 17 is secured to opposite radial arms 11 of the upper compartment 8 for the purpose of attaching a bridle by means of which the trap may be lowered into the water. A marker or float is attached to the upper end of the bridle or rope leading to the surface so that the position of the trap may be known at all times. An anchor (not shown) may be suitably attached to the trap by fastening same to the stays 5 in any suitable manner to fix the position of the trap on the water bottom.

All metal portions of the trap are made of galvanized or non-ferrous material to avoid deterioration through rust.

The screen and frame work are secured together at all joints by soldering, welding, brazing or other suitable means.

While I have shown and described a preferred embodiment of my invention, it will be understood that changes in construction may be made without departing from the scope of the invention as defined by the appended claims.

I claim:

1. A trap for shell-fish and the like comprising spaced, superposed compartments, a trap entrance for each compartment opening to the space between said compartments, a bait carrying cage supported by said upper compartment, projecting into the trap entrance space common to both compartments, and a bait container in said cage, the upper portion of said container being imperforate, the lower portion being perforate to exhibit the contents on all sides.

2. A trap for shell-fish and the like comprising spaced, superposed dome-like shaped compartments, the upper compartment being reversed with respect to the lower one, coincident trap entrances for each compartment, and a bait cage carried by one of said compartments and projecting through both trap entrances and the space between said compartments, so as to be visible on all sides.

3. A trap for shell-fish and the like comprising a dome-like shaped, foraminous-screened compartment having a centrally disposed trap entrance on its upper surface, stays extending upwardly from said compartment, a substantially similarly shaped, inverted, foraminous-screened compartment supported on said stays with the trap entrance centrally disposed on its lower surface coincident with and spaced from the first named trap entrance, radially extending arms supported by said upper compartment, said arms supporting a bait cage centrally in said compartment, said cage extending through both trap entrances and the space therebetween, the sloping surfaces of said dome-like shaped compartments converging toward said trap entrances to provide a progressively restricted path to said entrances, the surface adjacent the edge of the upper opening being projected slightly downwardly to urge and direct the shell-fish into the lower compartment.

ERNEST LILE.